US007525473B2

(12) United States Patent
Chu et al.

(10) Patent No.: US 7,525,473 B2
(45) Date of Patent: Apr. 28, 2009

(54) APPARATUS AND METHOD FOR SETTING MACRO OF REMOTE CONTROL

(75) Inventors: Chang-nam Chu, Yongin-si (KR); Hee-min Kwon, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 240 days.

(21) Appl. No.: 11/030,331

(22) Filed: Jan. 7, 2005

(65) Prior Publication Data

US 2005/0231414 A1 Oct. 20, 2005

(30) Foreign Application Priority Data

Jan. 8, 2004 (KR) ..................... 10-2004-0001094

(51) Int. Cl.
*H04L 17/02* (2006.01)

(52) U.S. Cl. ................. 341/176; 340/825.72; 715/744; 715/765; 700/65; 348/734

(58) Field of Classification Search ................ 341/173, 341/176; 340/825.69, 825.72; 715/765, 715/744; 700/65; 348/734
See application file for complete search history.

(56) References Cited

U.S. PATENT DOCUMENTS

| | | | | |
|---|---|---|---|---|
| 4,999,622 | A * | 3/1991 | Amano et al. | 340/825.72 |
| 5,568,367 | A * | 10/1996 | Park | 362/109 |
| 5,689,353 | A * | 11/1997 | Darbee et al. | 398/112 |
| 5,778,256 | A * | 7/1998 | Darbee | 710/72 |
| 6,211,870 | B1 * | 4/2001 | Foster | 715/744 |
| 6,437,836 | B1 * | 8/2002 | Huang et al. | 348/734 |
| 6,587,067 | B2 * | 7/2003 | Darbee et al. | 341/176 |
| 6,640,144 | B1 * | 10/2003 | Huang et al. | 700/65 |
| 6,690,392 | B1 * | 2/2004 | Wugoski | 715/744 |
| 6,909,378 | B1 * | 6/2005 | Lambrechts et al. | 340/825.22 |
| 6,937,972 | B1 * | 8/2005 | Van Ee | 703/20 |
| 7,093,003 | B2 * | 8/2006 | Yuh et al. | 709/219 |
| 7,095,335 | B2 * | 8/2006 | De Bolster et al. | 340/825.72 |
| 7,206,559 | B2 * | 4/2007 | Meade, II | 455/151.1 |
| 7,218,243 | B2 * | 5/2007 | Hayes et al. | 340/825.72 |
| 7,283,084 | B2 * | 10/2007 | Di Peppe | 341/176 |

FOREIGN PATENT DOCUMENTS

| | | |
|---|---|---|
| JP | 2003-87881 | 3/2003 |
| KR | 2003-0041472 | 5/2003 |
| WO | WO 00/17738 | 3/2000 |

* cited by examiner

*Primary Examiner*—Albert K Wong
(74) *Attorney, Agent, or Firm*—Staas & Halsey LLP

(57) ABSTRACT

An apparatus and method for easily setting a macro of a programmable remote control using a PC. The apparatus setting a macro of a remote control including: an input unit, inputting data or commands; a display unit displaying the data input by the user and/or data that is able to be selected by the user; a data transceiver receiving data from the remote control and transmitting data to the remote control; a memory storing device names assigned by the user and a data file of device function control commands received from the remote control via the data transceiver; and a controller displaying on the display unit a list of the device names and the commands included in the data file stored in the memory and setting a command selected from the command list as a macro command corresponding to a macro name.

18 Claims, 8 Drawing Sheets

FIG. 2

| | |
|---|---|
| NUMBER(2BYTE) | ITEM(8BYTE) |
| 32 | "SKYLIFE" |
| COMMAND(2BYTE) | TEXT(8BYTE) |
| 0x3401 | "POWER" |
| 0x3402 | "PAUSE" |
| 0x3403 | "STOP" |
| 0x3404 | "FF" |
| 0x3405 | "REW" |
| 0x3406 | "VOLUME UP" |
| 0x3407 | "VOLUME DN" |
| 0x3408 | "MENU" |
| 0x3409 | "INPUT" |
| ..... | ..... |
| 0x340xx | "..." |

APPARATUS AND METHOD FOR SETTING MACRO OF REMOTE CONTROL

CROSS-REFERENCE TO RELATED APPLICATION

This application claims the priority of Korean Patent Application No. 2004-1094, filed on Jan. 8, 2004 in the Korean Intellectual Property Office, the disclosure of which is incorporated herein in its entirety by reference.

BACKGROUND OF THE INVENTION

1. Field of the Invention

The present invention relates to an apparatus and method of setting a macro of a remote control, and more particularly, to an apparatus and method of setting a macro of a programmable remote control using a personal computer (PC).

2. Description of the Related Art

Functions of many devices and electronic equipment are controlled by remote controls. Therefore, if the number of devices increases, the number of remote controls also increases and a user must manage various remote controls.

To solve a problem of the troublesome management of various remote controls, a programmable remote control that can operate a plurality of devices has been suggested. The programmable remote control is realized using a conventional remote control, a hand held phone (HHP), or a portable terminal.

However, since functions of different electronic devices are varied and numerous, the number of function keys of a remote control has increased. Accordingly, the number of function keys of the programmable remote control and how many times a user is required to manipulate the function keys are increasing.

For example, when a recording list stored in a storage medium such as a hard disk drive (HDD) of a personal video recorder (PVR) is searched based on titles or dates, and when the searched item is reproduced or deleted, a recording list button, a search button, a title input button, a button to select the searched item, and a reproducing or deleting button must be sequentially controlled. Also, when a digital versatile disc (DVD) is reproduced, TV power on, DVD power on, TV external input change, and DVD reproduction mode control must be sequentially controlled.

To simplify the control procedure, a macro function of the programmable remote control has been suggested. The macro function is a function sequentially generating a string of commands corresponding to the sequentially controlled buttons as described above in a programmable remote control using one macro key. The macro key is a user defined key and is allocated to the remote control by macro functions. The string of commands is called a macro command.

However, a conventional programmable remote control can control functions of devices only after a learning function is performed, in which function keys of remote controls for each device are mapped to function keys of the programmable remote control. Accordingly, the learning function must be performed for all devices to be controlled in order to set desired macro functions and it takes too much time to perform the learning function.

Also, after the learning function is performed, macro names to be set must be defined. However, since function keys of a programmable remote control generally provide a very limited macro naming ability, it is difficult for the macro names to be variously set.

If a macro name is determined, devices and function keys that will be used for performing the macro are selected, and if the selection is finished, storing the selected devices and function keys finishes setting of the macro. At this time, if one of the devices and function keys happens to be wrongly selected or skipped, an editing process for correcting or inserting is complicated. For example, if a DVD is reproduced in a status that a TV external input change process is wrongly skipped, several function keys must be controlled to insert the TV external input change process between a DVD power on process and a DVD reproduction mode control process. Therefore, users must set a macro function again.

SUMMARY OF THE INVENTION

In accordance with an aspect of the present invention an apparatus and method for easily setting macro functions of a programmable remote control using a PC are provided.

According to an aspect of the present invention, there is provided an apparatus setting a macro of a remote control, the apparatus including: an input unit inputting data or commands; a display unit displaying the data input by the user and/or data that is able to be selected by the user; a data transceiver receiving data from the remote control and transmitting data to the remote control; a memory storing device names assigned by the user and a data file of device function control commands received from the remote control via the data transceiver; and a controller displaying on the display unit a list of the device names and the commands included in the data file stored in the memory when a macro name is input by the input unit and setting a command selected from the command list as a macro command corresponding to the macro name.

According to another aspect of the present invention, there is provided a method of setting a macro of a remote control, the method including: if a command for controlling a function of a device assigned by a user is required, receiving a data file including a plurality of command for controlling functions of the device from a remote control of the assigned device; storing the received data file and a name of the device; if a macro name is input by the user, displaying the stored device name and a list of the commands; and setting a command selected from the command list as a macro command corresponding to a macro name.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which:

FIG. 2 is a table illustrating a format of a data file for commands controlling functions of devices belonging to the first through nth remote controls shown in FIG. 1;

DETAILED DESCRIPTION OF THE EMBODIMENTS

Figure 1:
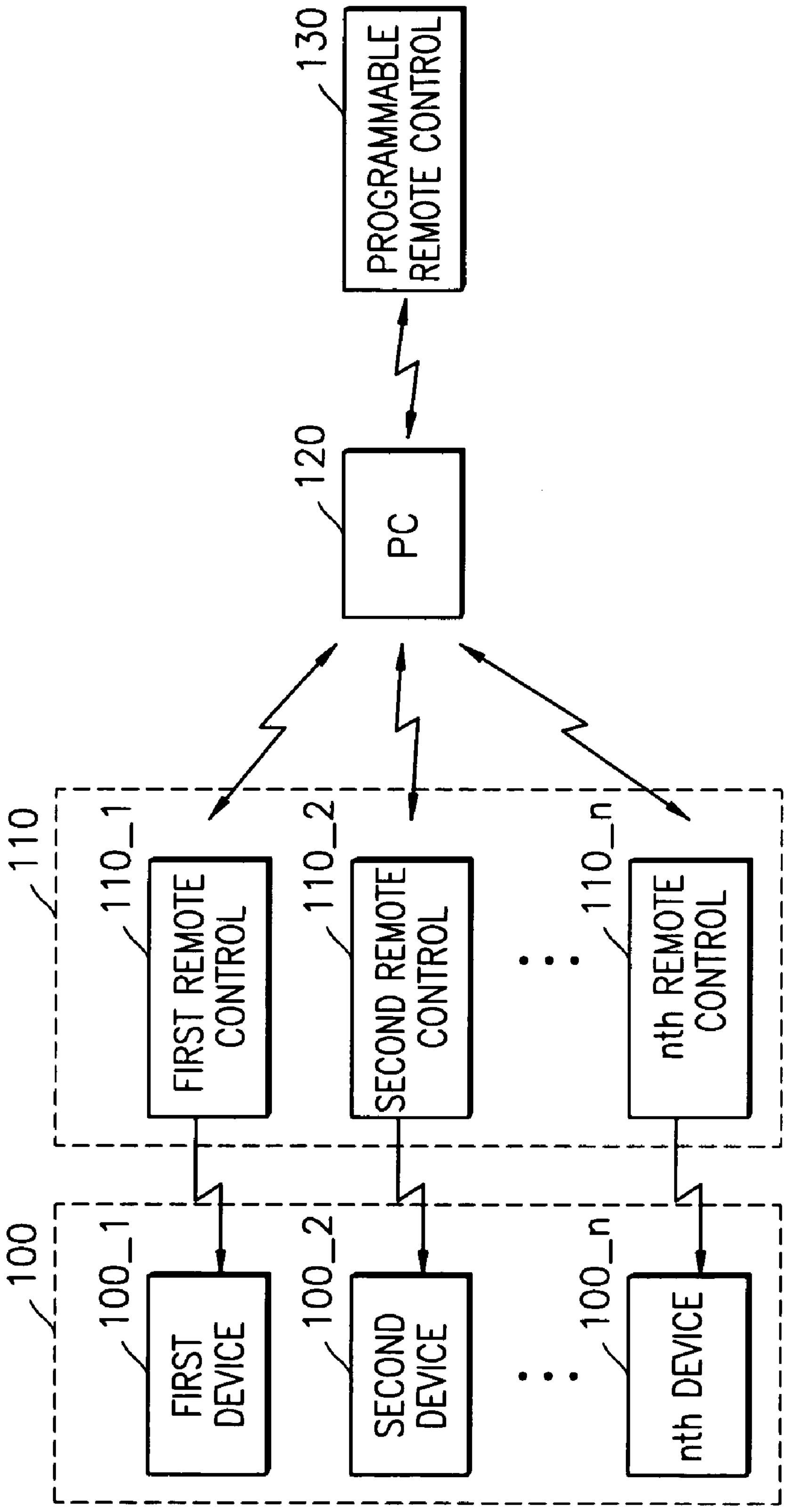
FIG. 1 is a block diagram of a system including an apparatus setting a macro of a remote control according to an embodiment of the present invention.

Reference will now be made in detail to the embodiments of the present invention, examples of which are illustrated in the accompanying drawings, wherein like reference numerals refer to the like elements throughout. The embodiments are described below to explain the present invention by referring to the figures.

FIG. 1 is a block diagram of a system including an apparatus setting a macro of a remote control according to an embodiment of the present invention. Referring to FIG. 1, the system includes a device group 100, a remote control group 110, a personal computer (PC) 120, and a programmable remote control 130.

The device group 100 includes first through nth devices 100_1 through 100_*n*. The first through nth devices 100_1 through 100_*n* are electronic equipment, such as TVs, DVDs, PVRs, Satellite dish systems (e.g. SKYLIFES, DIRECTV), cable set-top boxes (STBs), and camcorders, which are controllable by a remote control.

The remote control group 110 includes first through nth remote controls 110_1 through 110_*n*. The first through nth remote controls 110_1 through 110_*n* can remotely-control corresponding device functions using infrared rays (IR). Also, the first through nth remote controls 110_1 through 110_*n* are constructed so as to communicate with the PC 120 using a serial interface, such as a universal serial bus (USB), and/or a wireless interface such as IR. It is understood that other communication standards may be used like IEEE-1394, USB 2.0, Firewire, etc. Each of the first through nth remote controls 110_1 through 110_*n* can be a programmable remote control. Each of the first through nth remote controls 110_1 through 110_*n* has a data file including commands controlling functions of a corresponding device.

The data file can have a format such as shown in FIG. 2. Referring to FIG. 2, a first 2 bytes are used to indicate the total number of commands. Here, FIG. 2 shows an example where the total number of commands is 32. The next 8 bytes indicate a device name controlled by a relevant remote control. Here, FIG. 2 shows an example where the assigned device name is "Skylife." Next, data for a command is set every 10 bytes, wherein 2 bytes indicate IR code data and 8 bytes indicate a text name that a user can recognize in the PC 120. The number of bytes illustrated in FIG. 2 can be changed.

The data file is transmitted to the PC 120 from a remote control in response to a request of the PC 120. The transmission is performed in data file units. Therefore, the size of a data file transmitted from the remote control to the PC 120 varies according to the number of commands included in the data file.

The PC 120 is constructed so as to be able to communicate with the first through nth remote controls 110_1 through 110_*n* included in the remote control group 110 and the programmable remote control 130 and performs a function of setting a macro of a remote control according to an embodiment of the present invention.

Figure 3:
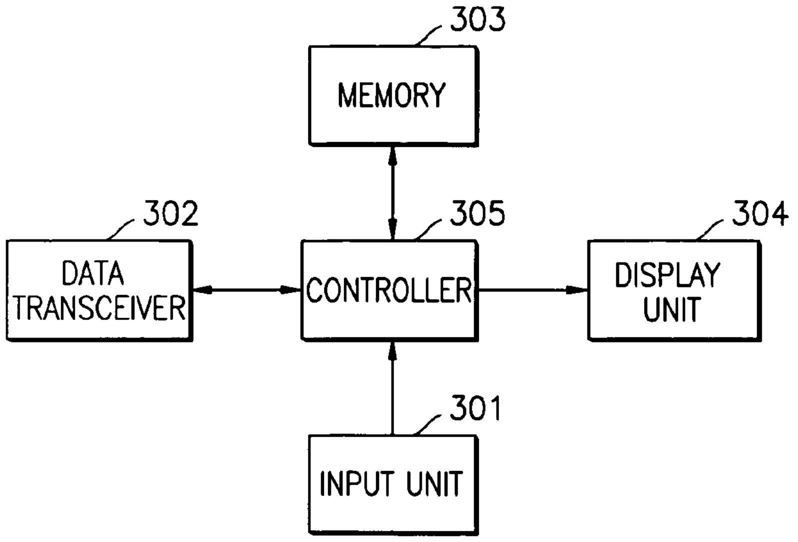
FIG. 3 is a block diagram of the PC shown in FIG. 1.

FIG. 3 is a block diagram of the PC 120 shown in FIG. 1 that includes an input unit 301, a data transceiver 302, a memory 303, a display unit 304, and a controller 305.

Referring to FIG. 3, a user inputs desired data and/or commands using the input unit 301. Therefore, the user inputs a macro name, selection information of devices and commands required to set a macro, a request to receive a data file including commands from a remote control, and a request to transmit a set macro command and macro name via the input unit 301.

The data transceiver 302 transmits data to the first through nth remote controls 110_1 through 110_*n* of the remote control group 110 and the programmable remote control 130 and receives data from the first through nth remote controls 110_1 through 110_*n* and the programmable remote control 130. Because the data transceiver 302 includes a communication protocol and a communication process for communicating with the first through nth remote controls 110_1 through 110_*n* and the programmable remote control 130, the data transceiver 302 matches sync with each remote control by connecting to each remote control using a serial interface, for example a USB, and/or a wireless interface, such as IR, and matching a data transfer rate with each remote control 110_1 through 110_*n*. Synchronization between each remote control 110_1 through 110_*n* and the PC 120 prevents data loss.

The memory 303 stores a device name assigned by the user and a data file including device control commands received from at least one of the remote controls 110_1 through 110_*n* via the data transceiver 302. When data files of a plurality of devices are stored, data files of device names and commands are stored in device units.

The display unit 304 displays data input by the user and/or data that can be selected by the user. The user can generate a macro command by selecting devices and commands required to set a desired macro function on the basis of the data displayed on the display unit 304 and perform an editing function of correcting, deleting, or inserting the desired macro command.

Figure 4:
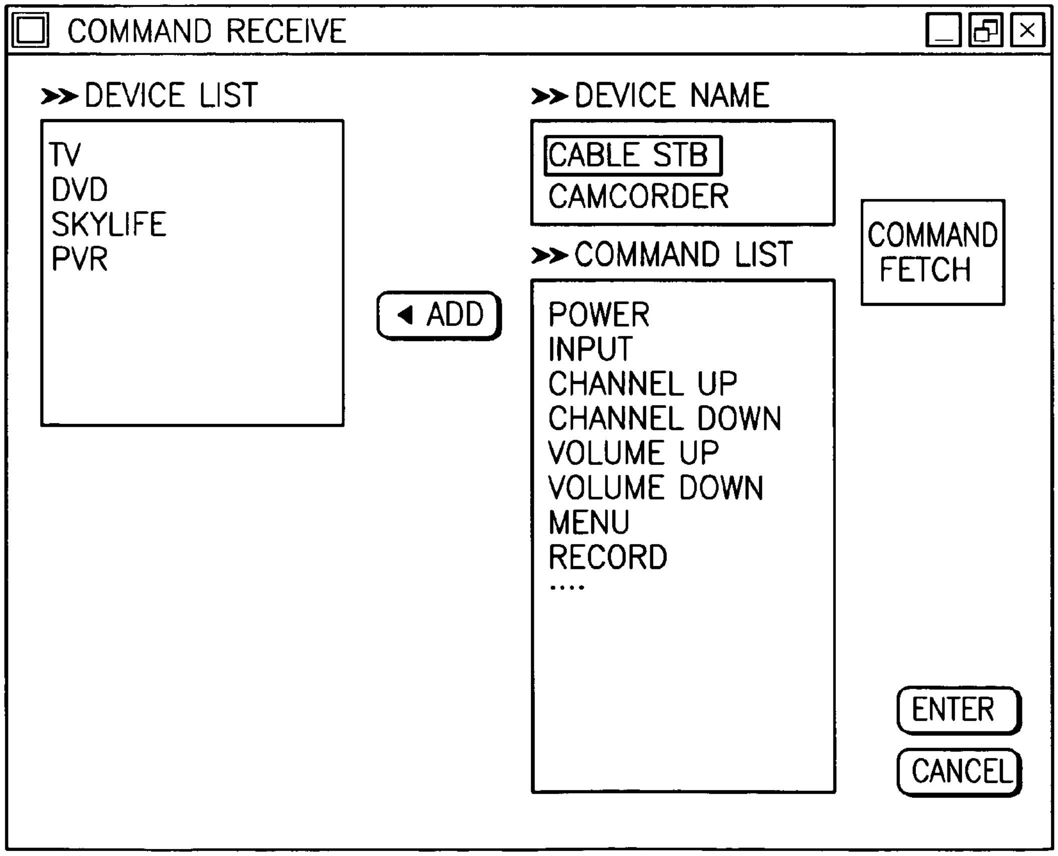
FIG. 4 is a screen displayed on a display unit shown in FIG. 3 when a data file is received from a remote control.

That is, when a data file including commands is received from a remote control, a screen displayed on the display unit 304 is the exemplary embodiment of the present invention shown in FIG. 4. Referring to FIG. 4, a device list window shows a list of devices from which the PC 120 has already received a data file including commands. A device name window shows names of devices which may be selected to receive a data file including commands, and the devices are devices controlled by a remote control currently connected to the PC 120 via a wired line or a wireless interface.

A command list window shows a command list of a cable STB selected among the device names displayed in the device name window. The command list is a list of commands included in a data file received via the data transceiver 302 by selecting a cable STB in the device name window and clicking a command fetch button.

If the user checks the command list and clicks an add button, the cable STB is added to the device list window, and a device name of the cable STB and a set of the commands displayed in the command list window are stored in the memory 303.

Figure 5:
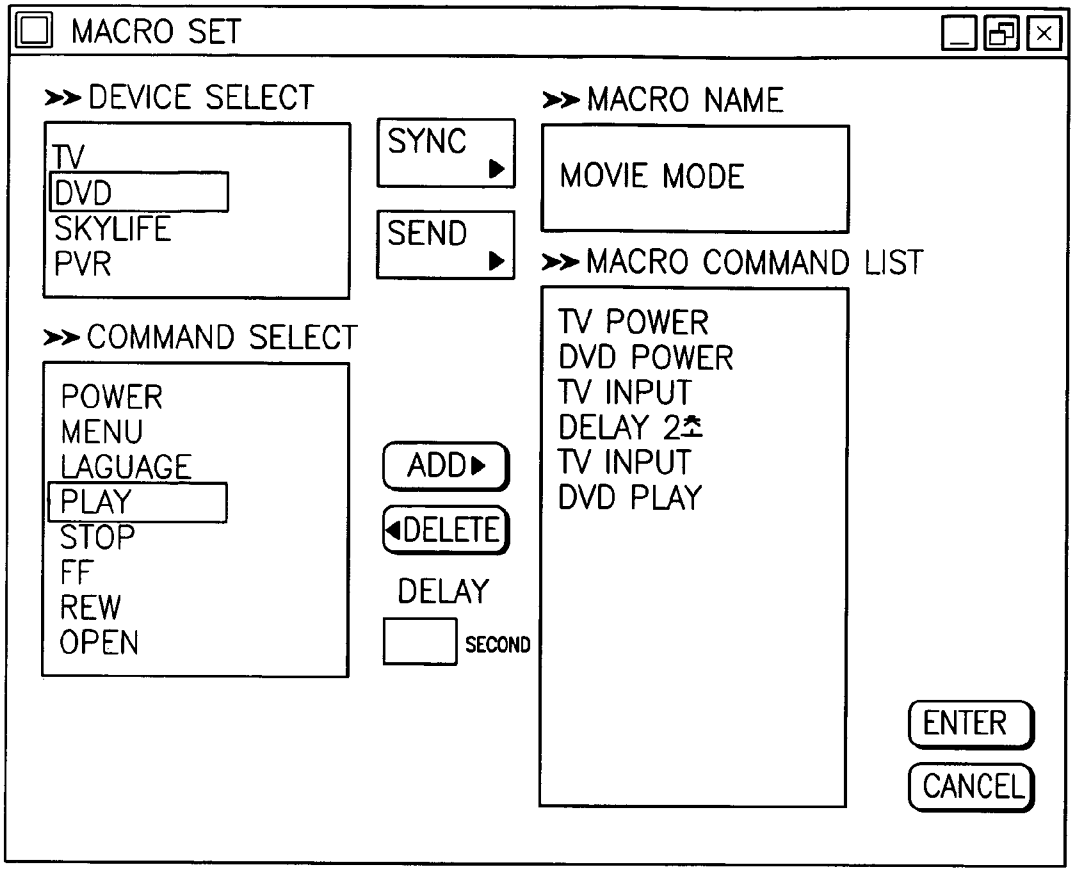
FIG. 5 is a screen displayed on the display unit shown in FIG. 3 when a macro is set.

FIG. 5 is a screen displayed on the display unit 304 shown in FIG. 3 when a macro is set according to an embodiment of the present invention.

A device select window shows names of devices currently stored in the memory 303. A command select window shows a list of commands allocated to a device name among the device names displayed on the device select window. A user can select a device and a device control command required to set a macro with reference to list of commands.

A macro name window shows a name of a macro to be set. FIG. 5 shows an example where "movie mode" is set as the macro name. A macro command list window sequentially displays commands selected by the user from the command select window. A sync button determines whether a macro name and a macro command are written in a remote control regardless of whether the macro name and macro command exist in the remote control or written in the remote control only if the macro name and macro command are not in the remote control.

When a macro name and a macro command are clearly set, the user clicks a send button. Accordingly, the set macro name and macro command are transmitted to a relevant remote control. The relevant remote control can be one of the programmable remote control 130 or the first through nth remote controls 110_1 through 110_*n* included in the remote control group 110. Add, delete, and delay buttons are used when the macro command displayed on the macro command list window is edited.

If a data file including commands controlling functions of a device is requested via the input unit 301, the controller 305 connects a remote control of the device and the PC 120 so that it is possible to communicate between the remote control and the PC 120. The controller 305 receives the requested data file including commands from the remote control, and stores the received data file in the memory 303 while simultaneously displaying a command list included in the data file on the display unit 304. At this time, the controller 305 builds the command list using text names (refer to FIG. 2) of the commands included in the received data file. A data file is transmitted by the device in device units in response to the request from the controller 305.

If a plurality of devices are managed by a remote control, since data files including command controlling functions of the devices are received via the data transceiver 302 in device units, the controller 305 displays the commands included in the data files received in the device units on the display unit 304 and stores the data files and the device names together in the memory 303.

When a data file including commands controlling functions of a device assigned by the user is received, the controller 305 displays device names that have been assigned by the user on the device list window as shown in FIG. 4.

Also, if a macro name is input via the input unit 301, the controller 305 displays names of devices stored in the memory 303 and a list of commands included in a data file on the display unit 304 and sets commands selected from the command list as a macro command corresponding to a macro name. The controller 305 transmits the macro command and the macro name to a remote control via the data transceiver 302. At this time, the remote control can be one of the programmable remote control 130 or the first through nth remote controls 110_1 through 110_*n*.

When the controller 305 transmits the macro command and the macro name to a remote control, the controller 305 can determine according to a command of the user (e.g., the sync button) whether it writes the macro name and the macro command in the remote control regardless of whether or not the macro name and macro command exist in the remote control or writes the macro name and macro command in the remote control only if the same macro name and macro command are not in the remote control and transmit the determined information to the remote control. The determined information is set according to whether the user clicks the sync button of FIG. 5.

The controller 305 displays the set macro command list on the display unit 304, and if a user requires editing of the macro command list, such as inserting a new macro command, deleting a macro command, or setting a delay function, the controller 305 inserts the new macro command, deletes the macro command, or sets the delay function at a position assigned by the user in the macro command list.

If the user requires the programmable remote control 130 to learn to remotely-control the first through nth devices 100_1 through 100_*n* included in the device group 100, the controller 305 causes the programmable remote control 130 to learn by transmitting a data file corresponding to one of the first through nth devices 100_1 through 100_*n* stored in the memory 303 to the programmable remote control 130 via the data transceiver 302. The data file is transmitted in device units.

When the programmable remote control 130 can remotely-control the first through nth devices 100_1 through 100_*n* included in the device group 100, the programmable remote control 130 can receive a macro name and macro command set by the PC 120 and transmit data files including commands of a plurality of devices to be managed to the PC 120 in response to a request of the PC 120. Also, as described above, the programmable remote control 130 can receive data files including commands possessed in the first through nth remote controls 110_1 through 110_*n* included in the remote control group 110 from the PC 120 and learn with respect to the first through nth remote controls 110_1 through 110_*n*.

It is understood that the screens shown in FIGS. 4 and 5 are illustrative examples, and that other graphical user interface (GUI) screens may be used with various configurations.

Figure 6:
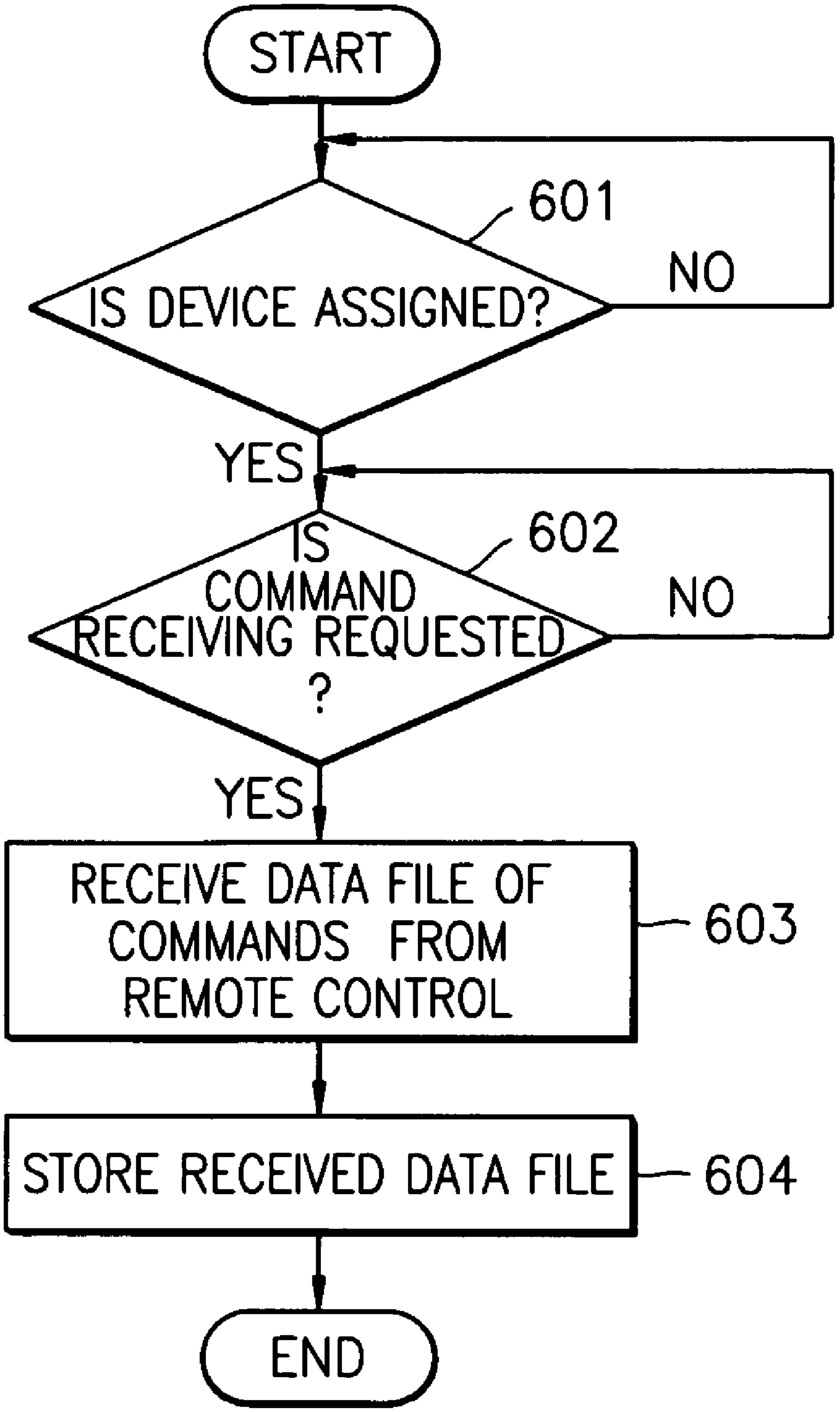
FIG. 6 is a flowchart of a process of receiving a data file for commands from a remote control in a method of setting a macro of a remote control according to an embodiment of the present invention.

FIG. 6 is a flowchart of a process of receiving a data file including commands from a remote control in a method of setting a macro of a remote control according to an embodiment of the present invention.

The controller 305 determines whether a user assigns a device in operation 601. If it is determined that a device is assigned in operation 601, the controller 305 determines whether receiving of commands of the assigned device is required in operation 602. If it is determined that the receiving of the commands is required in operation 602, the controller 305 receives a data file of the commands from a remote control in operation 603. In operation 603, a communication process is performed between the PC 120 and the remote control as shown in FIG. 7.

Figure 7:
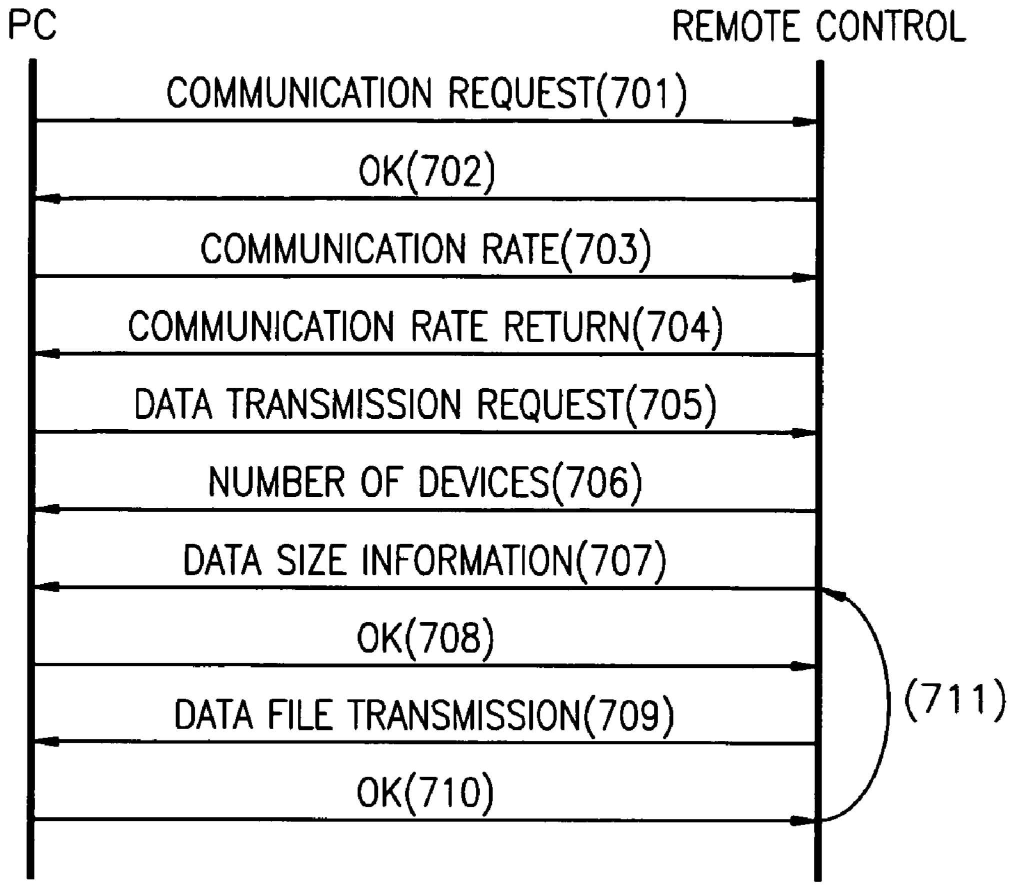
FIG. 7 is a communication sequence diagram illustrating communication between a PC and a remote control in a data file receiving operation of FIG. 6.

Referring to FIG. 7, the PC 120 transmits a communication request to a relevant remote control in operation 701, and if the PC 120 receives an OK message from the remote control in operation 702, the PC 120 requests a communication rate in operation 703. The relevant remote control is a remote control (i.e., the programmable remote control 130 or one of the first through nth remote controls 110_1 through 110_*n*) controlling functions of a device assigned by a user.

The remote control returns the communication rate to the PC 120 in operation 704 because it is easier to control the communication rate in the PC 120. However, it is possible to control the communication rate from the remote controls. If a data transfer rate is controlled in the PC 120 on the basis of the returned communication rate, the PC 120 requests a data transmission from the remote control in operation 705.

The remote control transmits information regarding a number of electronic devices (i.e., first through nth devices 100_1 through 100_$n$) to the PC 120 in operation 706. The number of electronic devices can be one or more. The remote control transmits data size information of a data file including commands of a particular device to be transmitted to the PC in operation 707 at first because the data size can vary according to the number of commands. The data size information can be, for example, a size of the data file including all the commands of the device.

The PC 120 transmits an OK message to the remote control in operation 708. The remote control transmits the data file to the PC 120 in operation 709. If the PC 120 clearly receives data on the basis of the set data size, the PC 120 transmits an OK message to the remote control in operation 710. At this time, after the PC 120 transmits the OK message, the PC 120 stores the received data file in the memory in operation 604 and displays the received data file on the display unit 304 as described in FIG. 3.

If there is another data file to transmit from the remote control to the PC 120, the communication process returns to operation 707 and is repeated between the remote control and the PC 120 in operation 711 until no additional data files are transmitted.

Figure 8:
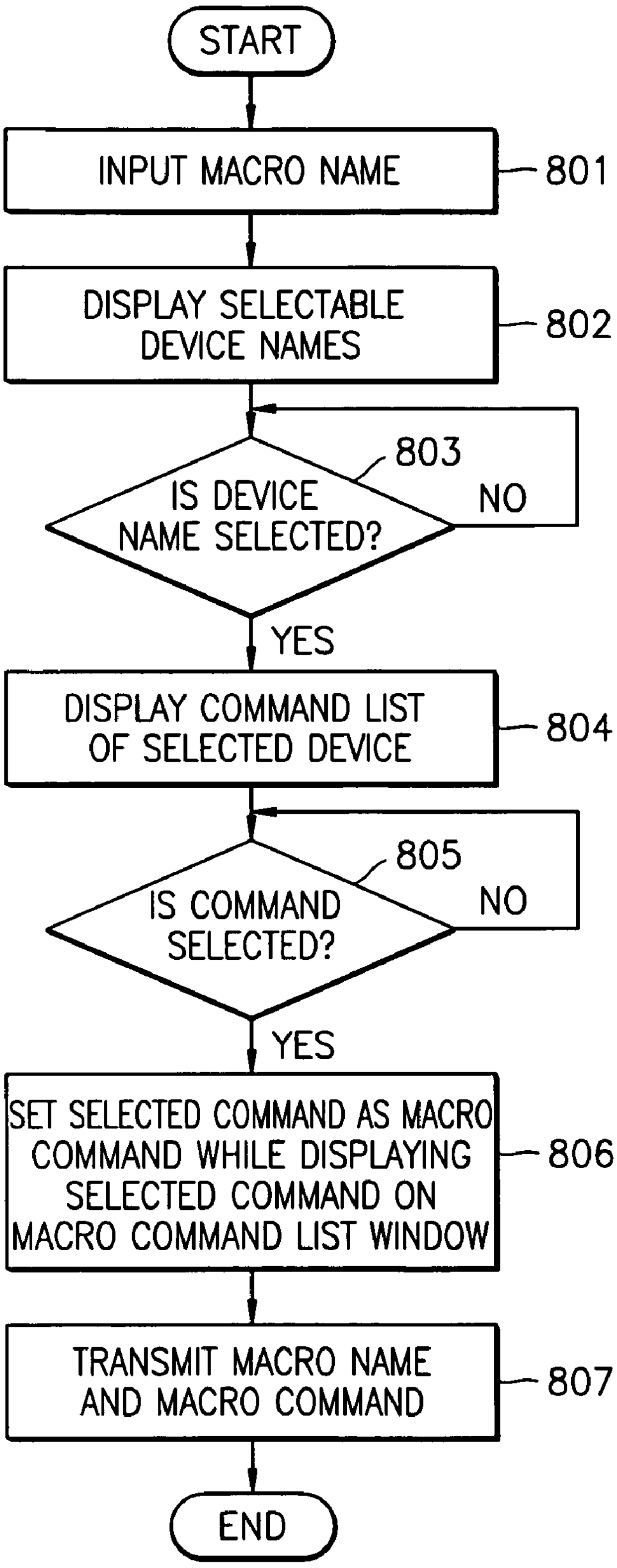
FIG. 8 is a flowchart of a process of setting and transmitting a macro name and macro commands in a method of setting a macro of a remote control according to an embodiment of the present invention.

FIG. 8 is a flowchart of a process of setting and transmitting a macro name and macro command in a method of setting a macro of a remote control according to an embodiment of the present invention.

If a macro name is input by a user in operation 801, selectable device names are displayed in operation 802. The selectable device names are names of devices stored in the memory 303.

If the user selects a device name among the selectable device names in operation 803, a command list of the selected device is displayed in operation 804. If the user selects a command from the displayed command list in operation 805, the selected command is set as a macro command and simultaneously displayed on the macro command list window of FIG. 5 in operation 806. The set macro name and at least one macro command are transmitted to a relevant remote control in operation 807. One or more macro commands may be associated with the macro name.

Figure 9:
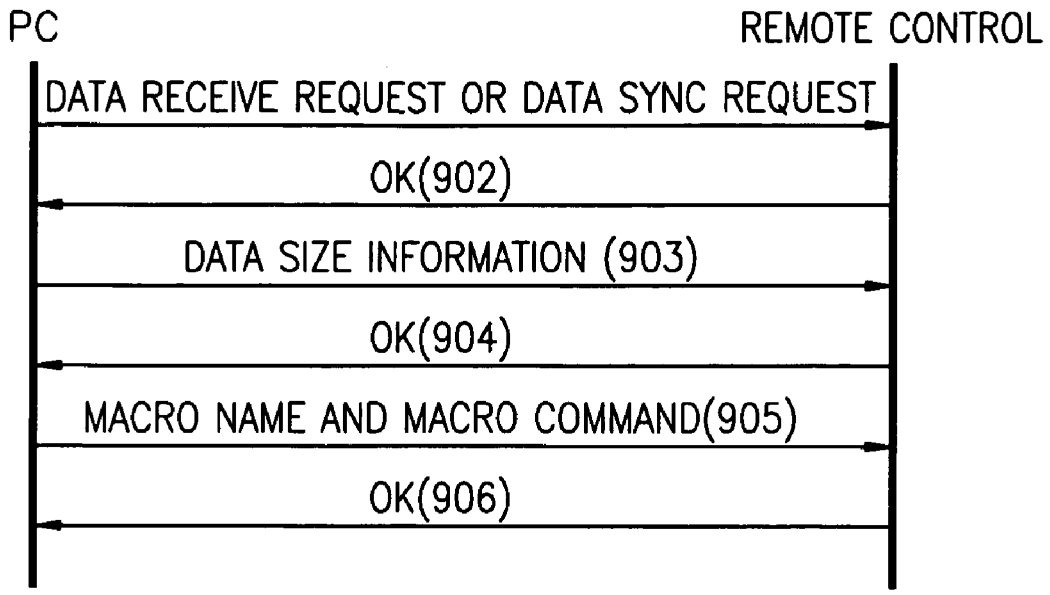
FIG. 9 is a communication sequence diagram illustrating communication between a PC and a remote control in the macro name and macro command transmitting operation of FIG. 8.

FIG. 9 is a communication sequence diagram between the PC 120 and the remote control in the macro name and macro commands transmitting operation of FIG. 8.

The PC 120 transmits a data receive request or a data sync request to the remote control in operation 901. The sync request is a result of clicking the sync button of FIG. 5.

If the remote control transmits an OK message to the PC 120 in operation 902, the PC 120 transmits size information of data to be transmitted to the remote control in operation 903. If the remote control transmits an OK message to the PC 120 in operation 904, the PC 120 transmits the macro name and the at least one macro command to the remote control in operation 905. If the remote control receives the macro name and macro command without error, the remote control transmits an OK message to the PC 120 in operation 906.

Before the communication process of FIG. 9 is performed, the PC 120 and the relevant remote control perform a mutual communication process by operations 701 through 704 illustrated in FIG. 7 to establish a communication link.

As described above, according to aspects of the present invention, since macro functions are set using a PC, a macro name can be set with various patterns.

Also, according to aspects of the present invention, since commands (or function keys) of a remote control of a device to be controlled are changed to texts, the commands are transmitted to a PC in device units, and the PC transmits the commands to a programmable remote control in device units, a learning function for a remote control of each device to be controlled can be performed easily and rapidly.

Also, according to aspects of the present invention, since macro functions are set and edited using command (or function key) information of a remote control of each device to be controlled, which is loaded and displayed on a PC, the macro functions are easily set and edited.

It is understood that the embodiments of the present invention described above can be written as computer programs and can be implemented in general-use digital computers that execute the programs using a computer readable recording medium. The computer readable recording medium is any data storage device that can store data which can be thereafter read by a computer system. Examples of the computer readable recording medium include magnetic storage media (e.g., ROM, floppy disks, hard disks, etc.), optical recording media (e.g., CD-ROMs, or DVDs), and storage media such as carrier waves (e.g., transmission through the Internet).

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An apparatus setting a macro for at least one remote control, the apparatus comprising:

an input unit, used by a user to input data;

a data transceiver communicating with the at least one remote control for setting the macro for the at least one remote control;

a memory storing names of devices to be controlled by the at least one remote control and a data file received from the at least one remote controls via the data transceiver, the data file including a device name and at least one command used in a device having the device name;

a controller, upon a macro name being input, retrieving device names from corresponding one or more data files stored in the memory, displaying, from the one or more data files, a list of the device names and a list of associated commands corresponding to device names selected from the list of device names, setting at least one command selected from the list of associated commands as a macro command corresponding to the macro name, and transmitting the macro command and the macro name to at least one remote control corresponding to a device having a selected device name via the data transceiver; and a display unit displaying the list of the device names and the list of associated commands, wherein the at least one remote controls includes at least one of a programmable remote controls and a remote control.

2. The apparatus of claim 1, wherein if a quantity of the devices is two or more, the controller receives data files each including a plurality of command controlling functions of each device in device units via the data transceiver and displays the plurality of command controlling functions included in the data files on the display unit while simultaneously storing the plurality of command controlling functions for each device in the memory.

3. The apparatus of claim 2, wherein when one of the data files including the plurality of command controlling functions of a selected one of the devices is received, the controller further displays the device names on the display unit.

4. The apparatus of claim 2, wherein the controller determines whether to write the macro name and the macro command in the remote control regardless of whether the macro name and macro command are stored in the remote control or write the macro name and the macro command in the remote control only if a same macro name and a same macro command are not stored in the remote control.

5. The apparatus of claim 2, wherein the controller displays the set macro commands on the display unit, and if the user requires editing of the macro command list, the controller implements an editing function for the macro commands at a position selected by a user from among the macro commands.

6. The apparatus of claim 5, wherein the editing function for the macro commands includes inserting a new macro command, deleting one of the macro commands, and setting a delay function.

7. The apparatus of claim 2, wherein if other remote controls are allocated to units of devices, and if the plurality of devices are controlled by the programmable remote control, the controller receives data files including the plurality of command from the remote control allocated to each device and transmits the macro command and macro name to the programmable remote control.

8. The apparatus of claim 2, wherein, if the remote controls are allocated to units of devices, and if the plurality of devices are controlled by the programmable remote control, the controller makes the programmable remote control learn by transmitting a data file stored in the memory to the programmable remote control.

9. The apparatus of claim 1, wherein the at least one command includes text names that are recognized by a user, and the controller displays the command list using the text names.

10. The apparatus of claim 1, wherein the controller synchronously transmits the macro command and the macro name to the remote control via the data transceiver.

11. A method of setting a macro of at least one remote control, the method comprising:

receiving a data file from the at least one remote control, wherein the data file includes a device name and at least one command used in a device having the device name;

storing the received data file;

retrieving device names from corresponding one or more data files stored in the memory;

displaying a list of the device names and a list of associated commands, corresponding to device names selected from the list of device names, upon a macro name being input;

setting at least one command selected from the list of associated commands, as a macro command corresponding to the macro name; and transmitting the macro command and the macro name to a remote control corresponding to a device having a selected device name via the data transceiver, wherein the at least one remote control includes at least one of a programmable remote control and a remote control.

12. The method of claim 11, wherein, if a number of devices is two or more, the receiving of the data file comprises:

receiving data files each including the plurality of commands controlling functions of each of the devices.

13. The method of claim 11, further comprising:

transmitting the macro command and the macro name to the programmable remote control when a number of devices that are assigned by the user is two or more.

14. A method of setting a macro controlling a plurality of devices for a programmable remote control using a computer, the method comprising:

receiving in the computer data files each including a corresponding plurality of commands to control each device from a corresponding remote control of each device and each device name of the plurality of devices;

storing each received data file in the computer;

displaying a list of the device names and a list of associated commands by retrieving corresponding one or more data files stored in the computer corresponding to device names selected from the list of the device names on a graphical user interface, when a macro name is input;

setting at least one command selected from the list of associated commands, as a macro command corresponding to the macro name in the programmable remote control; and transferring the macro name and the macro command to the programmable remote control.

15. A computer readable magnetic storage medium or optical recording medium encoded with a program to execute a method of setting a macro for at least one remote control using a PC, the method comprising:

receiving a data file from the at least one remote control, wherein the data file includes a device name and at least one command used in a device having the device name;

storing the received one or more data files;

displaying a list of the device names and a list of associated commands retrieved from the one or more stored data files corresponding to device names selected based on the list of the device names, when a macro name is input;

setting at least one command selected based on the list of associated commands, as a macro command corresponding to the macro name; and transmitting the macro command and the macro name to a remote control corresponding to a device having the selected device name via the data transceiver, wherein the at least one remote control includes at least one of a programmable remote control and a remote control.

16. A system comprising:

a programmable remote control;

a data transceiver, in order to set a macro for one or more remote controls, to receive data files including a plurality of commands from the one or more remote controls and to transmit a macro command, including one or more commands of the received commands and a macro name corresponding to the macro command, to the programmable remote control; and a controller retrieving device names from corresponding one or more data files stored in a memory, and displaying, from the one or more data files, a list of the device names and a list of associated commands corresponding to device names selected form the list of device names, wherein the data files further include each device name of devices controlled by the one or more remote controls.

17. The system of claim 16, further comprising a memory storing the data files.

18. A method comprising:

receiving data files including a plurality of commands and device names associated with the commands from one or more remote controls;

storing the received data files;

creating a list of device names from the stored data files;

selecting device names from the list of device names;

displaying the selected device names and a list created from the stored data files, of associated commands corresponding to the selected device names;

creating a macro command; and transmitting the macro command, including one or more commands of the plurality of commands, and a macro name corresponding to the macro command to a programmable remote control.

* * * * *

UNITED STATES PATENT AND TRADEMARK OFFICE

CERTIFICATE OF CORRECTION

PATENT NO. : 7,525,473 B2
APPLICATION NO. : 11/030331
DATED : April 28, 2009
INVENTOR(S) : Chang-nam Chu et al.

It is certified that error appears in the above-identified patent and that said Letters Patent is hereby corrected as shown below:

Column 8, Line 34, change “controls” to --control--.

Column 8, Line 51, change “controls” to --control--.

Column 8, Line 52, change “controls” to --control--.

Signed and Sealed this

Eighteenth Day of August, 2009

David J. Kappos
*Director of the United States Patent and Trademark Office*